United States Patent
Pescione et al.

(10) Patent No.: US 9,811,109 B2
(45) Date of Patent: Nov. 7, 2017

(54) CONTROL DEVICE FOR A CRAWLER VEHICLE

(75) Inventors: Fabio Pescione, Avella (IT); Enrico Conti, Brescia (IT); Sergio Magrini, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 882 days.

(21) Appl. No.: 13/882,349

(22) PCT Filed: Oct. 28, 2011

(86) PCT No.: PCT/EP2011/069022
§ 371 (c)(1),
(2), (4) Date: Oct. 2, 2013

(87) PCT Pub. No.: WO2012/056015
PCT Pub. Date: May 3, 2012

(65) Prior Publication Data
US 2014/0013892 A1   Jan. 16, 2014

(30) Foreign Application Priority Data

Oct. 29, 2010   (IT) .............................. MO2010A0303

(51) Int. Cl.
*B60K 6/00*      (2006.01)
*G05G 9/02*      (2006.01)
(Continued)

(52) U.S. Cl.
CPC .............. *G05G 9/02* (2013.01); *E02F 9/2004* (2013.01); *F16H 59/02* (2013.01); *F16H 61/24* (2013.01); *Y10T 74/20073* (2015.01)

(58) Field of Classification Search
CPC .................. F16H 59/02; F16H 59/0204; F16H 2059/0295; F16H 61/24; F16H 2061/243
See application file for complete search history.

(56) References Cited

U.S. PATENT DOCUMENTS 2,845,818 A * 8/1958 Siljander ................ B62D 11/08
                                                   180/6.2
2,943,501 A * 7/1960 Stapleton ............ F16H 61/0286
                                                   74/335
(Continued)

FOREIGN PATENT DOCUMENTS

DE       3601168       7/1987
DE       4428206       11/1995
(Continued)

OTHER PUBLICATIONS

European Search Report for Italian Application No. MO20100303 dated Jul. 19, 2011 (8 pages).

*Primary Examiner* — Zakaria Elahmadi
(74) *Attorney, Agent, or Firm* — Rickard K. DeMille; Rebecca L. Henkel

(57) ABSTRACT

A control device for a crawler vehicle, comprising a control lever activated by an operator about a fulcrum and having a free end, the control lever being displaceable along a longitudinal direction of the vehicle between a proximal position closer to the operator and a distal position further from the operator in order to control a main clutch of the vehicle, the control device further comprising a support element suitable for being fixed to a body of the vehicle in order to support an operator's hand when the hand acts on the control lever, wherein the control lever has an intermediate portion interposed between the free end and the fulcrum, the intermediate portion being so shaped as to partially embrace the support element in the proximal position.

10 Claims, 4 Drawing Sheets

(51) Int. Cl.
 *E02F 9/20* (2006.01)
 *F16H 59/02* (2006.01)
 *F16H 61/24* (2006.01)

(56) References Cited

U.S. PATENT DOCUMENTS

| | | | | |
|---|---|---|---|---|
| 3,941,008 A * | 3/1976 | Cambria | ............... | F16H 59/10 74/143 |
| 4,103,559 A * | 8/1978 | Kohler | ............... | E02F 9/2004 137/636.2 |
| 4,119,119 A * | 10/1978 | Ballendux | ............ | F16H 59/045 137/868 |
| 4,485,689 A * | 12/1984 | Cambria | ............... | B60K 20/00 74/473.21 |
| 4,555,962 A * | 12/1985 | Bucarelli | ............ | B60K 23/04 192/12 C |
| 4,794,808 A * | 1/1989 | Hausermann | .......... | F16H 59/08 74/335 |
| 4,912,997 A * | 4/1990 | Malcolm | .............. | F16H 59/044 338/128 |
| 5,060,538 A * | 10/1991 | Schnell | ................ | F16H 63/20 74/473.28 |
| 5,123,294 A * | 6/1992 | Hatakeyama | .......... | F16H 59/10 251/297 |
| 5,263,385 A * | 11/1993 | Hirata | ................... | B60K 26/00 188/378 |
| 5,309,784 A * | 5/1994 | Kobayashi | ............. | F16H 59/10 74/473.27 |
| 5,829,309 A * | 11/1998 | Wagner | ................. | F16H 59/10 74/473.1 |
| 2002/0005302 A1* | 1/2002 | Hidaka | ................ | B62D 11/183 180/6.24 |
| 2005/0239596 A1* | 10/2005 | Giefer | ................. | F16H 59/105 477/96 |

FOREIGN PATENT DOCUMENTS

| | | |
|---|---|---|
| EP | 1571374 | 9/2005 |
| WO | 2004/003406 | 1/2004 |
| WO | 2008/017344 | 2/2008 |

* cited by examiner

CONTROL DEVICE FOR A CRAWLER VEHICLE

CROSS REFERENCE TO RELATED APPLICATIONS

This application is the US National Stage filing of International Application Serial No. PCT/EP2011/069022, entitled "A CONTROL DEVICE FOR A CRAWLER VEHICLE.," filed Oct. 28, 2011, which claims priority to Italian Application Serial No. MO2010A000303, filed Oct. 29, 2010, each of which is incorporated by reference herein in its entirety for all purposes.

TECHNICAL FIELD

The invention relates to a control device for a crawler vehicle, the control device being suitable for enabling an operator to control the transmission of the vehicle, by engaging or disengaging a main clutch of the vehicle and possibly also by steering to the left or to the right. The device according to the invention can be mounted on a crawler vehicle such as an agricultural machine, for example a tractor, a construction machine or an industrial machine.

The invention further relates to a crawler vehicle comprising the above mentioned device.

BACKGROUND

Crawler tractors normally comprise a motor connected to a transmission device by a driving shaft. A main clutch is arranged along the driving shaft for selectively connecting or disconnecting the transmission device and the motor. The transmission device rotates a right shaft and a left shaft, connected respectively to a right drive sprocket and a left drive sprocket, each of which is arranged for moving a corresponding track. A brake and a steering clutch are associated to each drive sprocket in order to enable the operator to steer in the corresponding direction. In particular, if the operator desires to steer to the right along a relatively wide steering arc, he simply has to disengage the steering clutch associated with the right track. If it is instead desired to steer to the right along a relatively narrow arc, in addition to disengaging the right steering clutch the operator must also act on the brake associated to the right track. Similar operations have to be performed on the left track if it is desired to steer the vehicle to the left.

In known tractors, the transmission device is controlled by means of a plurality of levers, which comprise at least a first lever for engaging or disengaging the main clutch, a second lever for steering the tractor to the right or to the left, and a third lever for changing gear. Other levers are also normally provided for performing additional operations such as controlling the parking brake, the accelerator or particular implements driven by the tractor.

The known tractors of the kind described above are quite complicated to be driven, due to the great number of manual controls that have to be activated by the operator, sometimes even simultaneously.

In order to overcome this drawback, attempts have been made to provide a single control lever by means of which the operator can both engage or disengage the main clutch, and steer the tractor to the left or to the right. However, such attempts have never led to a device which can be easily adopted on an industrial scale and is easy to be controlled by an operator.

An object of the invention is to improve devices for controlling the transmission of a vehicle, particularly a crawler vehicle.

Another object is to provide a device for controlling the transmission of a vehicle by engaging or disengaging a main clutch of the vehicle, which device enables the operator to understand step by step in which position the main clutch is and can therefore be easily operated.

A further object is to provide a device for controlling the transmission of a vehicle, which device has a simple and compact structure and can therefore be easily manufactured on an industrial scale.

According to the invention, there is provided a device for controlling the transmission of a crawler vehicle, comprising:
  a lever element which is actuatable by an operator, the lever element being continuously displaceable between a plurality of positions;
  control means operable by the lever element for engaging or disengaging a main clutch of the vehicle;
characterized in that the device further comprises a cam member cooperating with a rocker arm assembly for applying to the lever element a controlled force, said controlled force depending on the position of the lever element.

During operation of the device according to the invention, the controlled force applied on the lever element by the cam member cooperating with the rocker arm assembly provides the operator with precise information concerning the position of the lever element, and consequently of the main clutch of the vehicle. The operator may therefore understand step by step how the device for controlling the transmission of the vehicle is moving, which makes the device particularly easy to be operated.

By properly selecting the profile of the cam member, it is furthermore possible to ensure that the force applied to the lever element is adapted to the specific application for which the device according to the invention is intended.

Owing to the cam member and the rocker arm assembly, a device can be obtained having a particularly simple structure, the device being made of a reduced number of mechanical components. This makes it easier mounting and repairing the device, if necessary. The device can therefore be easily manufactured and adopted even on an industrial scale.

If desired, the device according to the invention can be coupled to a steering system, so that the same lever element can be used both for engaging or disengaging the main clutch, and for steering the vehicle to the left or to the right. This further improves the vehicle control.

In an embodiment, the cam member is delimited by a cam profile having a recess for stably receiving a cam follower of the rocker arm assembly, in a position of the lever element corresponding to a configuration in which the main clutch is engaged.

In an embodiment, the cam profile further has a valley for stably receiving the cam follower in a stable neutral position of the lever element.

Thus, it is possible to obtain a device exhibiting two stable positions. In the first stable position, the clutch is completely engaged and the vehicle advances, whereas in the second stable position the clutch is disengaged and the vehicle is stationary. Theoretically, a number of stable positions greater than two can be provided.

SUMMARY OF THE INVENTION

According to the invention a device for controlling the transmission of a crawler vehicle is provided. The device comprises a lever element which is actuatable by an operator, the lever element being continuously displaceable between a plurality of positions. The device also includes a control means operable by the lever element for engaging or disengaging a main clutch of the vehicle. The device further comprises a cam member which cooperates with a rocker arm assembly for applying on the lever element a controlled force. The controlled force depends on the position of the lever element. The cam member is rotatingly coupled to the lever element, so that the operator can rotate the lever element rightwards or leftwards in order to steer the vehicle, without altering the position of the cam member.

BRIEF DESCRIPTION OF THE DRAWINGS

The invention will be better understood and carried out with reference to the attached drawings, which illustrate, by way of non-limiting example, an embodiment of the invention, and in which.

DETAILED DESCRIPTION OF THE EMBODIMENT(S)

Figure 1:
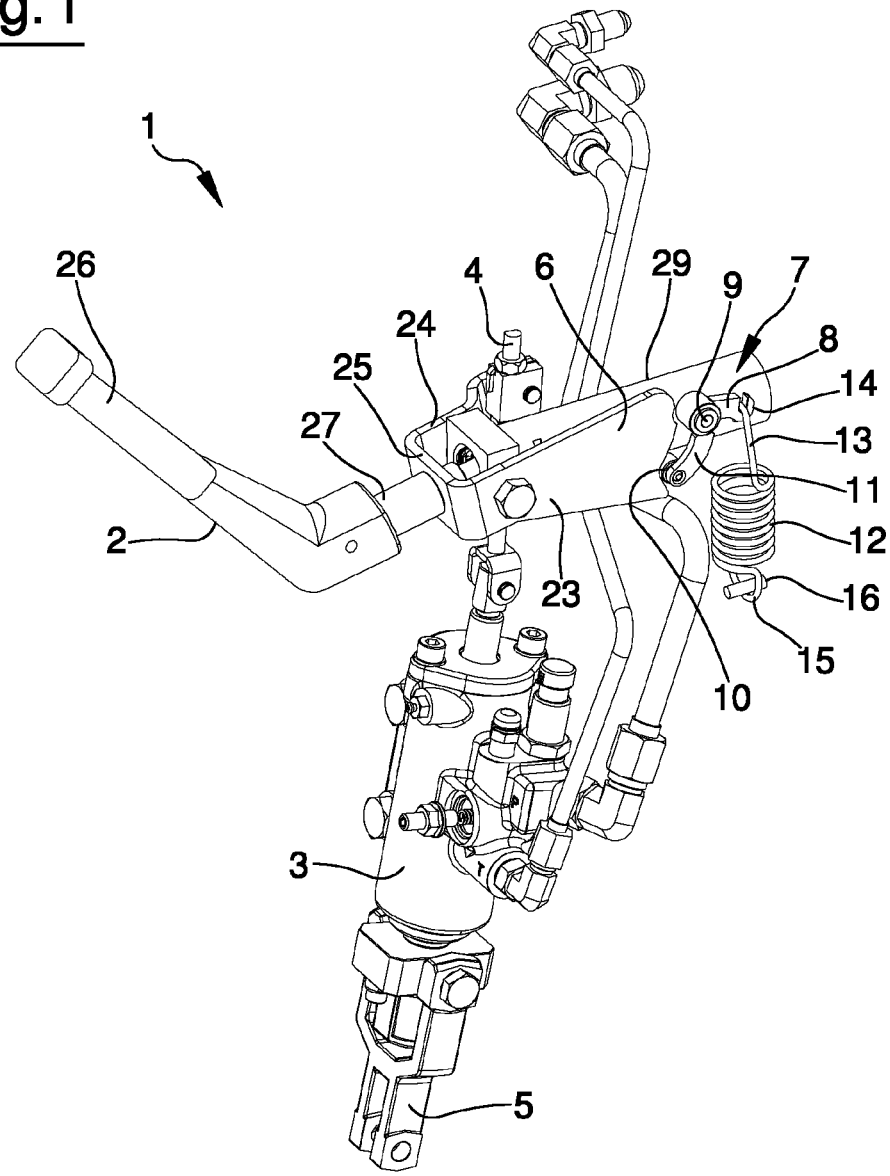
FIG. 1 is a perspective view showing a device for controlling the transmission of a crawler vehicle.

FIG. 1 shows a device 1 for controlling the transmission of a crawler vehicle, particularly an agricultural machine such as a tractor, or a construction machine or an industrial machine. The device 1 is suitable for enabling an operator to engage or disengage a main clutch of the vehicle.

In an embodiment, the device 1 can furthermore enable the operator to steer the vehicle to the right or to the left.

The device 1 comprises a lever element 2 which can be displaced by an operator's hand for engaging or disengaging the main clutch. During working, the lever element 2 is positioned in front of a seat intended for receiving the operator, so that the operator can actuate the lever element 2 as he looks forward in order to drive the vehicle.

The lever element 2 can comprise a handling portion 26, on which the operator acts, and a stem 27 fastened to the handling portion 26.

The device 1 further comprises control means operable by means of the lever element 2, the control means acting on the main clutch.

The control means can comprise hydraulic means. In the shown example, the control means can comprise a hydraulic distributor suitable for selectively sending a pressurized fluid, for example oil, to a hydraulic cylinder 3. The position of the hydraulic distributor can be controlled by a control rod 4, which is better shown in FIGS. 3 to 6, the control rod 4 being connected to the lever element 2, as will be described in more detail below.

The hydraulic distributor is not visible in the Figures because it can for example be housed in an enclosure of the hydraulic cylinder 3. A stem is movable inside the hydraulic cylinder 3 and a transmission element, shaped for example as a fork 5, is connected to the stem. The fork 5 is in turn connected to a lever assembly which is not shown, the lever assembly enabling a plate of the main clutch to be displaced in order to engage or disengage the clutch.

It is also possible to use control means of a type different from that described above, for example of a completely mechanic type.

A cam member 6 is interposed between the lever element 2 and the control means, the cam member 6 cooperating with a rocker arm assembly 7. In particular, in the illustrated example, the cam member 6 is mounted on the lever element 2.

The rocker arm assembly 7 comprises an oscillating body 8 that oscillates around a pin 9. The pin 9 is fastened to a support that is not shown, the support being fixed relative to a frame of the vehicle and being for example shaped as a plate.

A cam follower is mounted on the oscillating body 8, the cam follower being shaped as a wheel 10, suitable for contacting the cam member 6. The wheel 10 can be for example mounted on a first arm 11 of the oscillating body 8, particularly at an end of the first arm 11.

The wheel 10 can comprise a rolling bearing, for example a ball bearing or a needle bearing. By including a rolling bearing in the wheel 10, it is possible to reduce friction between the rocker arm assembly 7 and the cam member 6, thereby ensuring constant and replicable performances in time.

The rolling bearing included in the wheel 10 can contact directly the cam member 6, or it can be provided with an external cover element arranged in contact with the cam member 6.

The device 1 further comprises elastic means acting on the oscillating body 8 for keeping the wheel 10 in contact with the cam member 6. The elastic means may comprise a spring 12, for example a helical spring, interposed between the oscillating body 8 and the vehicle frame. To this end, the spring 12 can have an end 13 fixed to a second arm 14 of the oscillating body 8. A further end 15 of the spring 12, opposite the end 13, can be connected to a peg 16 arranged in a position which is fixed relative to the vehicle frame.

The spring 12 can extend along a vertical or nearly vertical axis, so as to apply to the oscillating body 8 a substantially vertical force.

The second arm 14 can extend along a horizontal or nearly horizontal direction. In the illustrated example, the first arm 11 extends downwards, so as to form an angle greater than 90° with the second arm 14.

Figure 2:
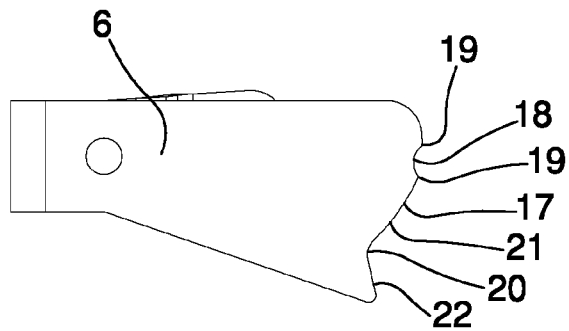
FIG. 2 is a side view showing a cam member included in the device of FIG. 1.

The cam member 6 is provided with a cam profile 17 that is better visible in FIG. 2.

The cam profile 17 has a recess 18 arranged for receiving the wheel 10 in a configuration in which the main clutch of the vehicle is engaged, as will be better explained below. The recess 18 can be delimited by a circle arc, so as to shapingly engage with a portion of the perimeter of the wheel 10. Two protruding edges 19 can be provided at the sides the recess 18, the protruding edges 19 projecting from the cam profile 17.

Owing to the shape of the recess 18 and to the protruding edges 19, the wheel 10 can be stably received in the recess 18.

The cam profile 17 further has a valley 20 arranged for receiving the wheel 10 in a neutral stable configuration, as will be better explained below. In the illustrated example, the valley 20 is arranged below the recess 18, during operation. The valley 20 penetrates inside the cam member 16 more deeply than the recess 18.

The bottom of the valley 20 is joined to the protruding edge 19 closer to the valley 20 by means of an inclined profile portion 21. The inclined profile portion 21 can be curved, for example convex towards the outside of the cam profile 17.

The cam profile 17 further comprises an inclined stretch 22 which extends from the bottom of the valley 20 towards the periphery of the cam profile 17. The inclined stretch 22 can have a substantially rectilinear extension.

In the illustrated example, the cam member 6 is obtained in a "U"-shaped bracket, said bracket having a first longitudinal branch 23 and a second longitudinal branch 24 joined to one another by a transverse portion 25.

A hole is obtained in the transverse portion 25, the stem 27 fastened to the handling portion 26 of the lever element 2 passing through said hole. Between the hole of the transverse portion 25 and the stem 27 a preset clearance is provided, so as to allow a relative rotation between the stem 27 and the cam member 6.

Figure 8:
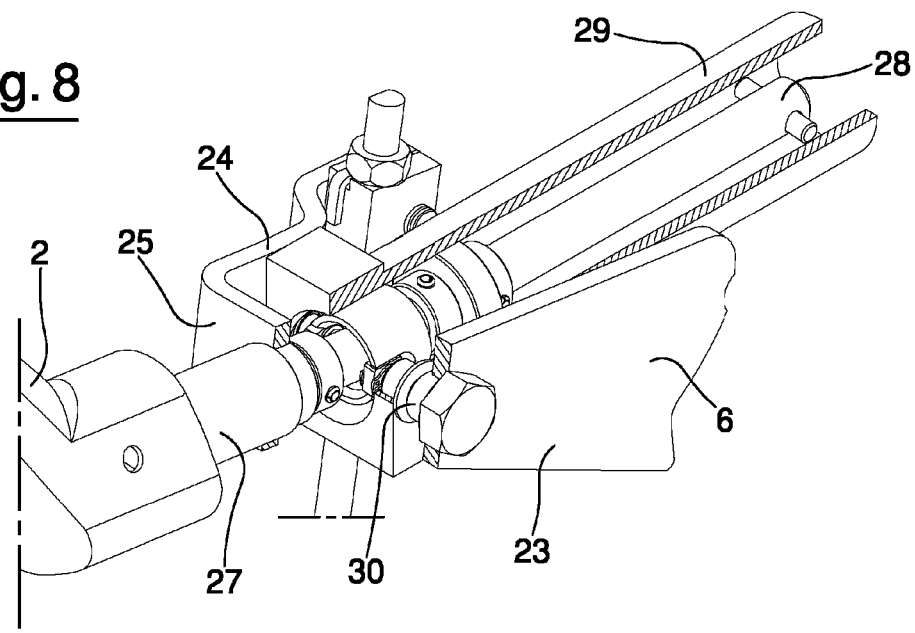
FIG. 8 is an enlarged, partially sectioned, perspective view showing a detail of the lever element.

A shaft 28, shown in FIG. 8, is connected to the stem 27 by connecting means, the connecting means being capable of transmitting a torque from the stem 27 to the shaft 28. The connecting means can for example comprise a cross joint. The connecting means define a fulcrum around which the lever element 2 can oscillate.

The shaft 28 extends inside a tubular element 29 which is fixed relative to the vehicle frame.

The first longitudinal branch 23 and the second longitudinal branch 24 are arranged at two opposite sides of the tubular element 29, which is thus interposed between the above mentioned longitudinal branches.

The cam member 6 is connected to the tubular element 29 by means of a connection which enables the cam member 6 to oscillate relative to the tubular element 29. To this end, in the illustrated example, two pin members 30, shown in FIGS. 7 and 8, project towards the inside of the tubular element 29 in diametrically opposite positions. The pin members 30 rotatingly engage in corresponding holes obtained respectively in the first longitudinal branch 23 and in the second longitudinal branch 24. Thus, the cam member 6 can oscillate about the pin members 30 relative to the tubular element 29.

The cam profile 17 is obtained along a free end of the first longitudinal branch 23 opposite the transverse portion 25.

The control rod 4 is on the other hand connected to the second longitudinal branch 24, for example at a free end of the second longitudinal branch 24 opposite the transverse portion 25.

During working, the operator can move the lever element 2 between a plurality of positions, some of which are shown in FIGS. 3 to 6.

Figure 3:
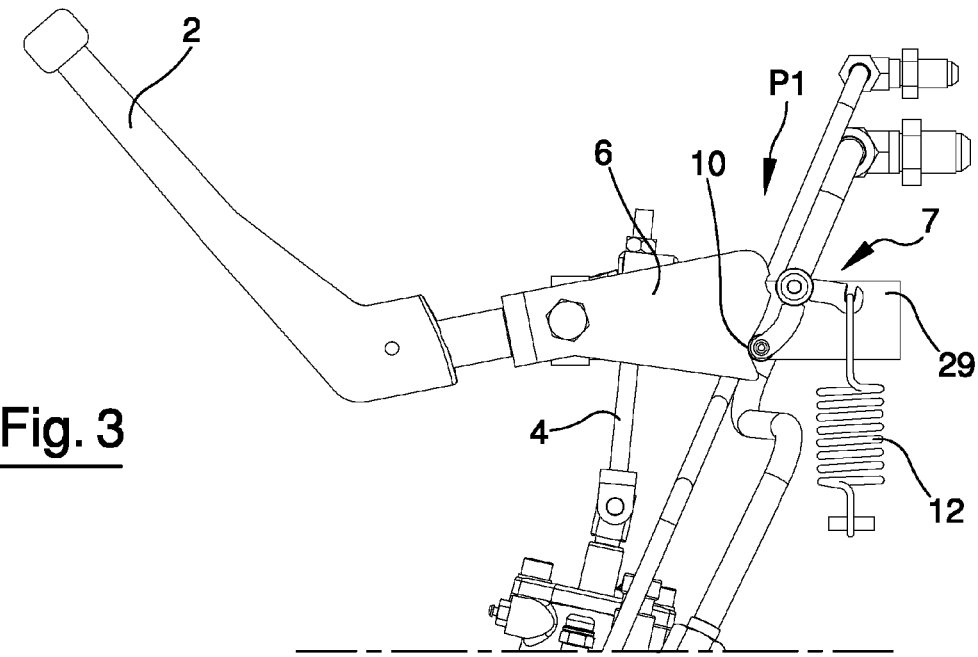
FIG. 3 is a side view showing a detail of the device of FIG. 1, the detail comprising a lever element arranged in a neutral stable position.

In particular, FIG. 3 shows a position P1 of the lever element 2 in which the wheel 10 is located in the centre of the valley 20, i.e. on the bottom of the valley 20. This configuration corresponds to a neutral stable configuration of the vehicle. As a matter of fact, in the configuration shown in FIG. 3 the cam member 6 is inclined around the pin members 30 of an angle such that the control lever 4 positions the hydraulic distributor in such a way that the hydraulic cylinder 3 disengages the main clutch.

The configuration shown in FIG. 3 is defined "stable" because in this configuration the forces which the rocker arm assembly 7 applies to the cam member 6 keep the cam member 6 in a position in which the wheel 10 is located in the centre of the valley 20. In the absence of external forces, the cam member 6 and the lever element 2 remain therefore in the position P1 shown in FIG. 3.

Figure 6:
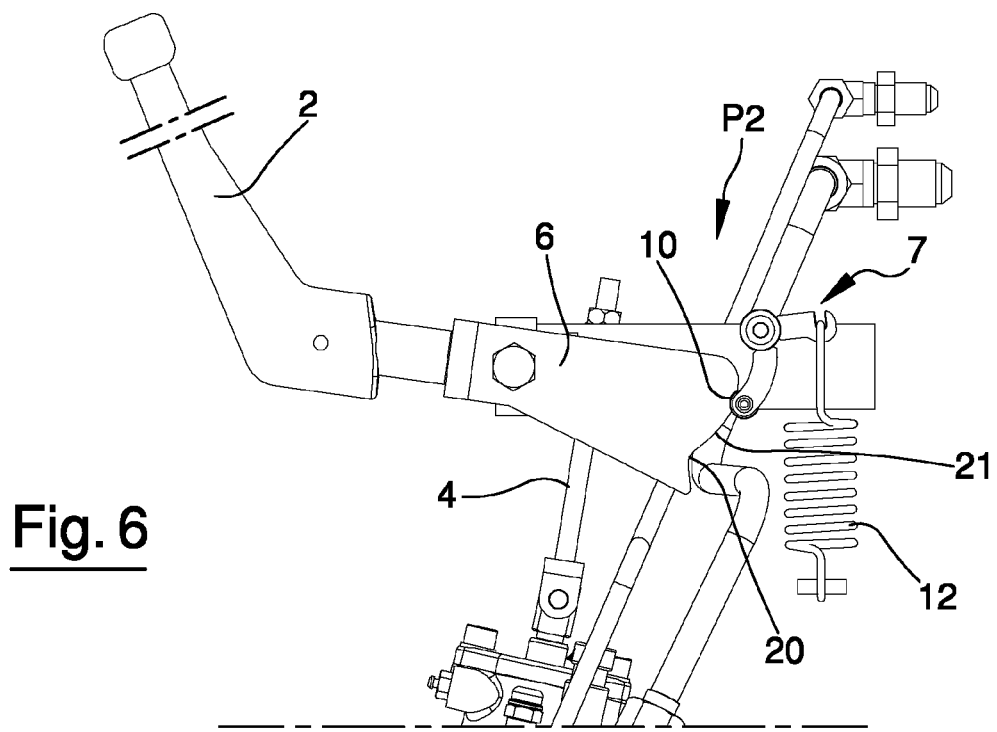
FIG. 6 is a side view like the one in FIG. 3, concerning a position of the lever element which corresponds to a configuration of vehicle stable advancement.

FIG. 6 shows a position P2 of the lever element 2 in which the wheel 10 is located in the recess 18. In this position, the control rod 4, displaced by the cam member 6, has changed the position of the hydraulic distributor in such a way as to send pressurized fluid to the hydraulic cylinder 3. The latter, by means of the fork 5 and of the lever assembly connected thereto, has engaged the main clutch of the vehicle.

If the operator releases the lever element 2 when the wheel 10 is in the recess 18, the wheel remains in a balance condition in the recess 18. The position P2 shown in FIG. 6 can therefore be defined as an advancement stable position.

Figure 4:
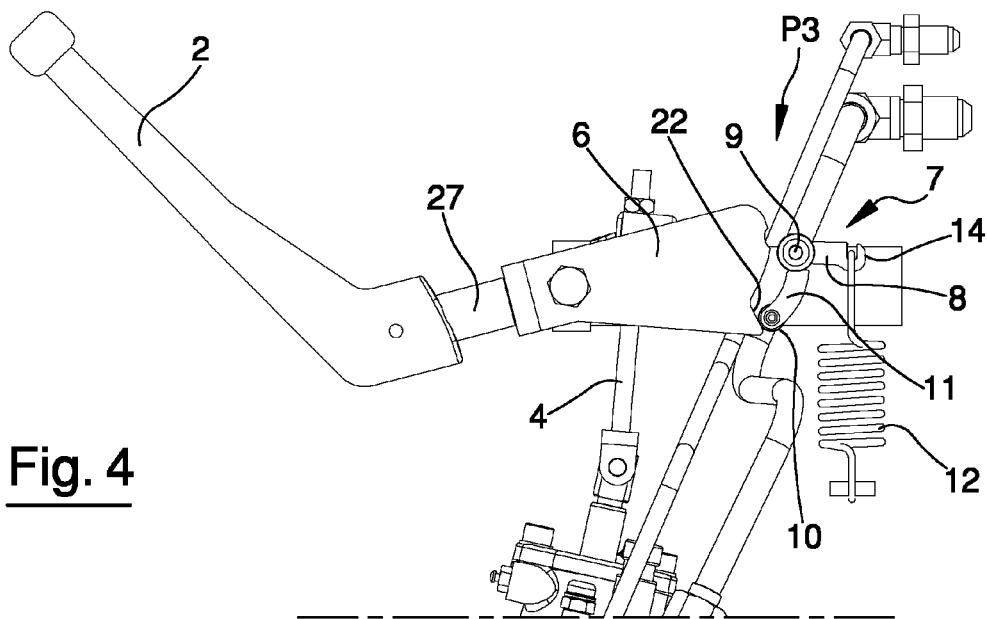
FIG. 4 is a side view like the one in FIG. 3, concerning a position of the lever element in which a braking device for braking a gearing mechanism of the vehicle gearbox is activated.

FIG. 4 shows a position P3 of the lever element 2 in which the wheel 10 comes into contact with the inclined stretch 22 of the cam profile 17. In this position, the lever element 2 activates a transmission brake of known type, which enables a halting of the gearing mechanism of the vehicle gearbox, so that the operator can change gear without clashing.

If, starting from the advancement stable position P2 shown in FIG. 6, the operator wishes to change gear, he has to perform the simple sequence of actions that is described below. First of all, the operator pulls the lever element 2 towards his body, by rotating the lever element 2 around the fulcrum thereof. By so doing, the cam member 6 moves together with the lever element 2 and is correspondingly rotated about the pin members 30. The wheel 10 exits the recess 18 and comes into contact with the inclined profile portion 21, until the wheel 10 reaches the centre of the valley 20.

As the wheel 10 moves relative to the cam profile 17 towards the centre of the valley 20, the cam member 6, by means of the control rod 4, of the hydraulic cylinder 3 and of the lever assembly connected thereto, moves a shaft on which a plate of the main clutch is mounted and disengages the main clutch. The neutral stable position P1 is therefore reached.

Thereafter, the operator further pulls the lever element 2 towards himself, so that the wheel 10 comes into contact with the inclined stretch 22 of the cam profile 17, as shown in FIG. 4. The cam member 6 acts on the hydraulic cylinder 3, which in turn further moves the shaft supporting the plate of the main clutch in order to activate the transmission brake. The gearing mechanism of the vehicle gearbox is therefore halted and is kept braked as long as the operator keeps the lever element 2 in a position in which the wheel 10 is in contact with the inclined stretch 22.

After halting the gearing mechanism by means of the transmission brake, the operator can release the lever element 2, which is automatically brought back into the neutral stable position P1 shown in FIG. 3. This is due to the fact that the force which the rocker arm assembly 7 applies to the cam member 6, and therefore to the lever element 2, along the inclined stretch 22, is such that, in the absence of external forces, the cam member 6 is positioned according to an inclination in which the wheel 10 is in the centre of the valley 20.

At this point, i.e. when the lever element 2 has been brought back to the neutral stable position P1, the operator can change gear by using a lever which is not shown.

Thereafter, the operator pushes the lever element 2 to the advancement stable position P2 so that the control means re-engage the main clutch.

If the lever element 2 is released in an intermediate position between the neutral stable position P1 shown in FIG. 3 and the advancement stable position P2 shown in FIG. 6, i.e. when the wheel 10 is located along the inclined profile portion 21, the lever element 2 automatically moves to the neutral stable position P1.

This occurs because, along the inclined profile portion 21, the rocker arm assembly 7 applies to the cam member 6, through the wheel 10, a force which tends to displace the cam member 6 in such a manner that the wheel 10 is positioned in the centre of the valley 20.

The force that the rocker arm assembly 7 applies to the cam member 6 depends both on the force exerted by the spring 12 and on the force due to contact between the cam profile 17 and the wheel 10. This latter force is influenced by the friction between the wheel 10 and the cam profile 17, as well as by the shape of the cam profile 17.

Owing to the inclined profile portion 21, it is possible to ensure that the rocker arm assembly 7 applies to the cam member 6 a force which gradually increases as the lever element 2 is moved from the neutral stable position P1 towards the advancement stable position P2.

Thus, the operator who moves the lever element 2 can have a precise idea, step by step, about the position of the lever element 2 and the extent of which the lever element 2 has still to be rotated before reaching the advancement stable position P2. In fact, the force that the operator has to apply to the lever element 2 for moving the latter from the neutral stable position P1 to the advancement stable position P2 is relatively low at the beginning, when the wheel 10 is still close to the centre of the valley 20. The greater said force, the closer is the wheel 10 to the recess 18. The operator is therefore capable of knowing, at any moment, how much the lever element 2 can still be displaced before the main clutch is stably engaged.

This is particularly useful when the operator wishes to modulate the position of the main clutch, thereby causing a controlled "skating" of the latter. By so doing, it is possible to displace forwards the vehicle slowly and precisely, for example in order to move the vehicle close to an implement for attaching the implement to a support of the vehicle.

The cam profile 17 can be freely selected in such a way that the force which needs to be applied to the lever element 2 varies according to a desired curve. Thus, it is possible to choose the most suitable curve for the type of application the vehicle is intended for.

Figure 5:
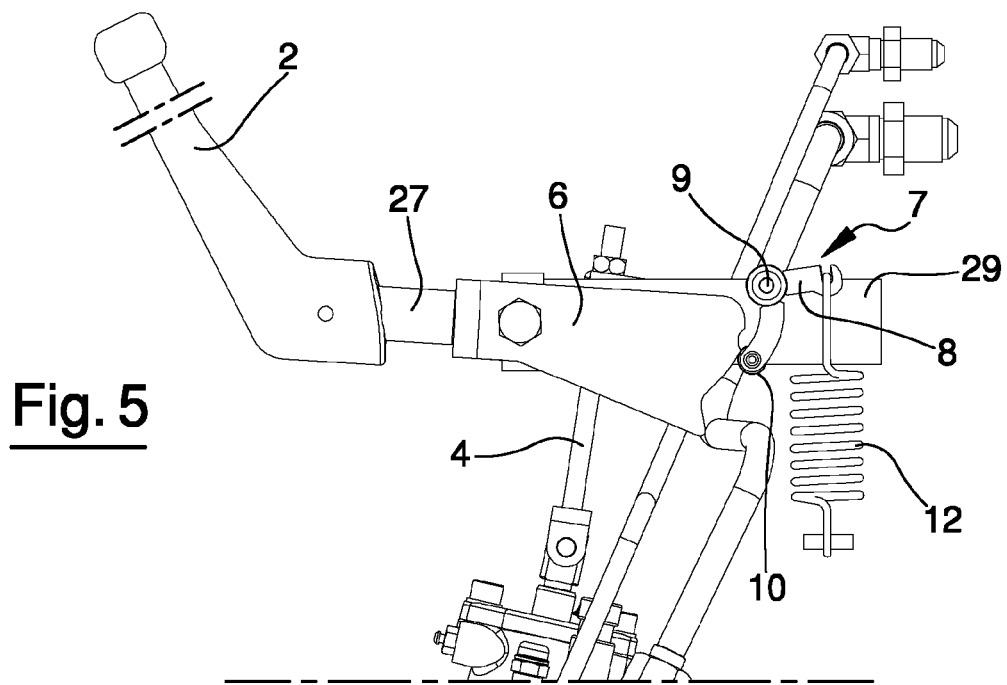
FIG. 5 is a side view like the one in FIG. 3, concerning an unstable position of the lever element.

The protruding edge 19 which delimits the recess 18 at the side closer to the valley 20 acts as a peak beyond which it is necessary to pass before stably engaging the main clutch. This peak gives the operator a precise indication that the main clutch has been stably engaged, because the operator first feels a rather quick increase in the force that needs to be applied to the lever element 2 (when the wheel 10 is positioned along the inclined profile portion 21 immediately before the protruding edge 19, as shown in FIG. 5) and subsequently a sudden decrease of this force, as soon as the wheel 10 is in the recess 18. This force variation occurs during a rotation of a few degrees of the lever element 2, for example a rotation of less than 10°. It is therefore avoided that the operator releases the lever element 2 while erroneously believing that the main clutch has been engaged, and the lever element 2 moves back to the neutral stable position P1.

The protruding edge 19 which delimits the recess 18 at the side further from the valley 20 acts on the other hand as a limit stop which blocks the lever element 2 in case the operator erroneously tries to displace the lever element 2 in such a way the wheel 10 is located beyond the recess 18.

The cam member 6 and the rocker arm assembly 7 define a particularly simple system, made of a small number of components, which allows the position of the lever element 2 to be precisely controlled, and enables the force which is required for moving the lever element 2 to be fine-tuned during the stroke of the lever element 2.

Furthermore, the lever element 2 can be optionally rotated rightwards or leftwards without influencing the position of the cam member 6. This rotation of the lever element 2 is useful when, by acting on a single lever element 2, it is possible both to engage or disengage the main clutch and to steer to the left or to the right, as happens in some known crawler vehicles.

To this end, it is recalled that the crawler vehicles are provided with a right track and a left track each of which is driven by a corresponding drive sprocket. A brake and a steering clutch are associated to each drive sprocket for enabling the operator to steer to the corresponding direction.

By tilting the lever element 2 leftwards, it is possible to disengage the steering clutch associated to the left track of the vehicle, in order to steer to the left along a relatively wide steering arc, and possibly also to act on the brake associated to the left track, in order to steer along a narrower steering arc.

Figure 7:
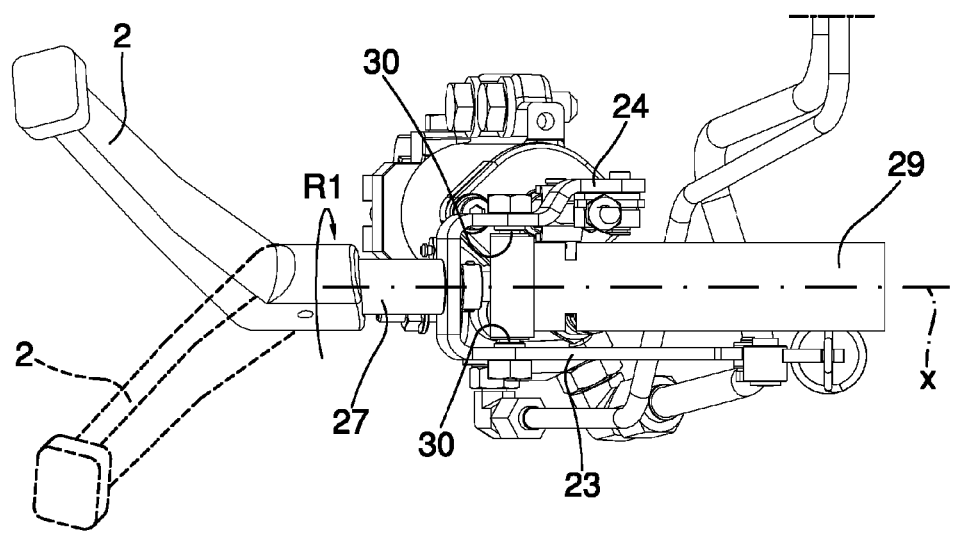
FIG. 7 is a view from the top showing a detail of the device in FIG. 1, in which the lever element is rotated for steering the vehicle.

This case is shown by a continuous line in FIG. 7, in which the lever element 2 has been rotated leftwards about a longitudinal axis X along which the stem 27 extends, as shown by the arrow R1. The connecting means which connect the stem 27 to the shaft 28 enable also the shaft 28 to be rotated leftwards. Thus, the shaft 28 can activate command means (not shown) that disengage the left steering clutch and possibly activate the brake associated to the left track.

It is stressed that by rotating the lever element 2 about the longitudinal axis X neither the cam member 6, nor the rocker arm assembly 7 are influenced. Indeed, the stem 27 rotates with a clearance inside the hole obtained in the transverse portion 25 associated to the cam member 6 and the position of the cam member 6 remains unchanged.

Also the shaft 28 rotates inside the tubular element 29 without moving the tubular element 29.

A similar situation occurs when the lever element 2 is rotated rightwards, as indicated by a broken line in FIG. 7, so as to steer to the right the crawler vehicle. Also in this case, the stem 27 oscillates inside the hole obtained in the transverse portion 25 and rotates the shaft 28 inside the tubular element 29, without altering functionality of the cam member 6 and of the rocker arm assembly 7.

Thus, the lever element 2 can be rotated rightwards or leftwards about the longitudinal axis X in positions P1, P2, P3 or in any intermediate position between P1 and P2 or P1 and P3. This makes possible to act on the steering clutches and possibly on the corresponding brakes in order to steer the vehicle even when changing gear.

The invention claimed is:

1. A device configured to control a transmission of a crawler vehicle, comprising:
   a lever element actuatable by an operator in a first direction and rotatable by the operator in a direction transverse to the first direction, the lever element being continuously displaceable between a plurality of positions;

a control element operable by the lever element and configured to engage and disengage a main clutch of the crawler vehicle; and a cam member cooperating with a rocker arm assembly to apply on the lever element a controlled force, the controlled force depending on a position of the lever element;

wherein the cam member is coupled to the lever element such that displacement of the lever element between the plurality of positions drives the cam member to rotate relative to the rocker arm assembly, and the lever element is rotatable relative to the cam member without altering a position of the cam member, wherein the cam member is delimited by a cam profile which has a recess configured to stably receive a cam follower of the rocker arm assembly in one of the plurality of positions of the lever element corresponding to a configuration in which the main clutch is engaged, wherein the cam profile has a valley configured to stably receive the cam follower in a neutral stable position of the lever element corresponding to a configuration in which the main clutch is disengaged, wherein the cam profile has a profile portion interposed between the valley and the recess, the profile portion being inclined toward the valley so that, if the lever element is released when the cam follower is in contact with the profile portion, the cam member brings the lever element back to the neutral stable position, wherein along the profile portion, the rocker arm assembly applies to the cam member a force which progressively increases from the valley towards the recess, wherein the cam profile has an inclined stretch arranged at an opposite side of the valley with respect to the recess so that, when the cam follower is in contact with the inclined stretch, a transmission brake suitable for braking a gearing mechanism of the vehicle gearbox is activated.

2. The device according to claim 1, wherein two projecting edges are provided at opposite ends of the recess to resist exit of the cam follower from the recess.

3. The device according to claim 1, wherein the inclined stretch has an inclination such that, if the lever element is released when the cam follower is in contact with the inclined stretch, the cam member brings the lever element back to the neutral stable position.

4. The device according to claim 1, wherein the cam follower comprises a rolling bearing which is supported by an oscillating body of the rocker arm assembly.

5. The device according to claim 4, comprising a biasing member acting on the oscillating body and configured to urge the cam follower into contact with the cam member.

6. The device according to claim 5, wherein the oscillating body comprises a first arm having an end region which supports the cam follower and a second arm having an end connected to the biasing member.

7. The device according to claim 1, comprising a bracket having a first longitudinal branch at an end of which the cam member is formed, and a second longitudinal branch connected to the control element, the first longitudinal branch being joined to the second longitudinal branch by a transverse portion which receives a stem of the lever element.

8. The crawler vehicle comprising the device according to claim 1.

9. The device according to claim 1, wherein the recess is delimited by a profile which is shaped as a circle arc.

10. The device according to claim 1, wherein the valley penetrates in the cam member more deeply than the recess.

* * * * *